(12) United States Patent
Tsai

(10) Patent No.: US 7,011,748 B2
(45) Date of Patent: Mar. 14, 2006

(54) WATER AERATING AND DIRT COLLECTING ASSEMBLY FOR AQUARIUM

(76) Inventor: Ting Feng Tsai, P.O. Box 63-298, Taichung (TW) 406

( * ) Notice: Subject to any disclaimer, the term of this patent is extended or adjusted under 35 U.S.C. 154(b) by 91 days.

(21) Appl. No.: 10/817,993

(22) Filed: Mar. 31, 2004

(65) Prior Publication Data

US 2005/0218051 A1    Oct. 6, 2005

(51) Int. Cl.
*A01K 63/04* (2006.01)
*C02F 1/74* (2006.01)

(52) U.S. Cl. .................. 210/169; 210/219; 210/416.2; 119/263

(58) Field of Classification Search ............... 210/169, 210/220, 221.2, 232, 416.1, 416.2, 219; 119/263, 119/262; 261/84
See application file for complete search history.

(56) References Cited

U.S. PATENT DOCUMENTS

| | | | | |
|---|---|---|---|---|
| 3,490,589 A | * | 1/1970 | Cymbalisty | 209/163 |
| 4,025,431 A | * | 5/1977 | Saxton | 210/108 |
| 4,043,914 A | * | 8/1977 | Horvath | 210/169 |
| 4,242,199 A | * | 12/1980 | Kelley | 210/758 |
| 5,059,315 A | | 10/1991 | Senape | 210/169 |
| 5,062,951 A | | 11/1991 | Tominaga | 210/169 |
| 5,169,520 A | | 12/1992 | Wang | 210/169 |
| 6,325,842 B1 | * | 12/2001 | Caldwell et al. | 95/263 |
| 6,523,498 B1 | * | 2/2003 | Shyu | 119/259 |
| 6,912,972 B1 | * | 7/2005 | Tsai | 119/263 |
| 2001/0055237 A1 | * | 12/2001 | Kubera et al. | 366/102 |
| 2002/0109243 A1 | * | 8/2002 | Vento | 261/29 |

FOREIGN PATENT DOCUMENTS

JP    63-294998    * 12/1988

* cited by examiner

*Primary Examiner*—Fred G. Prince
(74) *Attorney, Agent, or Firm*—Charles E. Baxley

(57) ABSTRACT

A water aerating device for an aquarium includes a housing having a chamber to receive a guide device which is arranged between an inlet and an outlet of the housing, a paddle wheel is rotatably attached onto the guide device, and a pumping device may be used to pump the water and to force the water to actuate the paddle wheel and to generate eddy current. Fresh air or carbon dioxide may be selectively pumped into the housing. A barrel may be used to adjustably attach the housing to the aquarium. A casing may be disposed on the barrel, to receive and collect dirt or protein carried by air bubbles that may be generated by the eddy current.

18 Claims, 10 Drawing Sheets

WATER AERATING AND DIRT COLLECTING ASSEMBLY FOR AQUARIUM

BACKGROUND OF THE INVENTION

1. Field of the Invention

The present invention relates to a water aerating and dirt collecting assembly, and more particularly to a water aerating and dirt collecting assembly for attaching to aquariums and for selectively pumping air and/or carbon dioxide into the aquariums, and/or for generating bubbles to collect dirt or protein or the like.

2. Description of the Prior Art

Various kinds of typical water aerating devices and/or water filtering devices have been developed for being attached to aquariums and for pumping air into the aquariums and/or for filtering the water.

For example, U.S. Pat. No. 5,059,315 to Senape, U.S. Pat. No. 5,062,951 to Tominaga, and U.S. Pat. No. 5,169,520 to Wang disclose three of the typical water aerating devices and/or water filtering devices, for supplying air into the aquariums, and/or for filtering the dirt from the circulating water.

However, the typical water aerating devices and/or the water filtering devices may only be used to pump air into the aquariums and/or to filter the circulating water, but may not be used to pump carbon dioxide into the aquariums, and thus may not be used to supply carbon dioxide to the plants contained in the aquariums.

In addition, dirt and protein may be generated and contained within the water of the aquariums, and may contaminate the aquariums. However, the typical water aerating devices and/or the water filtering devices may not be used to generate bubbles and to collect and to remove dirt or protein or the like from the aquariums.

The present invention has arisen to mitigate and/or obviate the afore-described disadvantages of the conventional water aerating assemblies for aquariums.

SUMMARY OF THE INVENTION

The primary objective of the present invention is to provide a water aerating and dirt collecting assembly for attaching to aquariums and for selectively pumping air and/or carbon dioxide into the aquariums, and/or for generating bubbles to collect dirt or protein or the like.

In accordance with one aspect of the invention, there is provided a water aerating assembly for an aquarium, the water aerating assembly comprising a housing including a chamber formed therein, and including an inlet and an outlet arranged to allow water to flow into and out of the chamber of the housing, a guide device received in the chamber of the housing and arranged between the inlet and the outlet of the housing, a paddle wheel rotatably attached onto the guide device, and a pumping device for pumping the water into the chamber of the housing, to force the water to actuate the paddle wheel and to generate eddy current.

The guide device includes at least one fin extended therefrom, to generate eddy current when the water is forced onto the fin of the guide device. The guide device includes a space formed therein and includes a plurality of orifices formed therein and communicating with the space of the guide device, to guide the eddy current to flow through the orifices and into the space of the guide device. The guide device includes a hub provided therein, and the paddle wheel is rotatably attached to the hub with a shaft.

The pumping device includes a container having an exit coupled to the inlet of the housing, and having an entrance to allow the water to flow into the container, and includes a pump received in the container. A hose may further be provided and coupled to the entrance of the container, to supply air into the container via the entrance of the container. A carbon dioxide reservoir may further be provided and coupled to the hose, to selectively supply carbon dioxide into the container.

A barrel may further be provided and attached onto the housing, to receive the eddy current. A cover may further be provided and selectively attached onto the barrel, to selectively enclose the barrel.

A casing may further be provided and attached onto the barrel, to receive air bubbles generated by the eddy current. The casing includes a tubular member extended therein to form an annular chamber therein, and to collect dirt carried with the air bubbles. The tubular member includes a height smaller than that of the casing. The casing includes a cap attached thereto, to enclose the casing. The casing includes a discharge port formed therein and communicating with the annular chamber thereof to discharge the collected dirt.

A rack may further be provided for attaching to the aquarium, and an adjusting device for adjusting the barrel relative to the rack. The adjusting device includes at least one magnet attached to the barrel, and at least one magnet attached to the rack to act with the magnet attached to the barrel. The rack includes a bracket pivotally secured thereto for attaching to the aquarium. A valve may further be provided and coupled to the outlet of the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
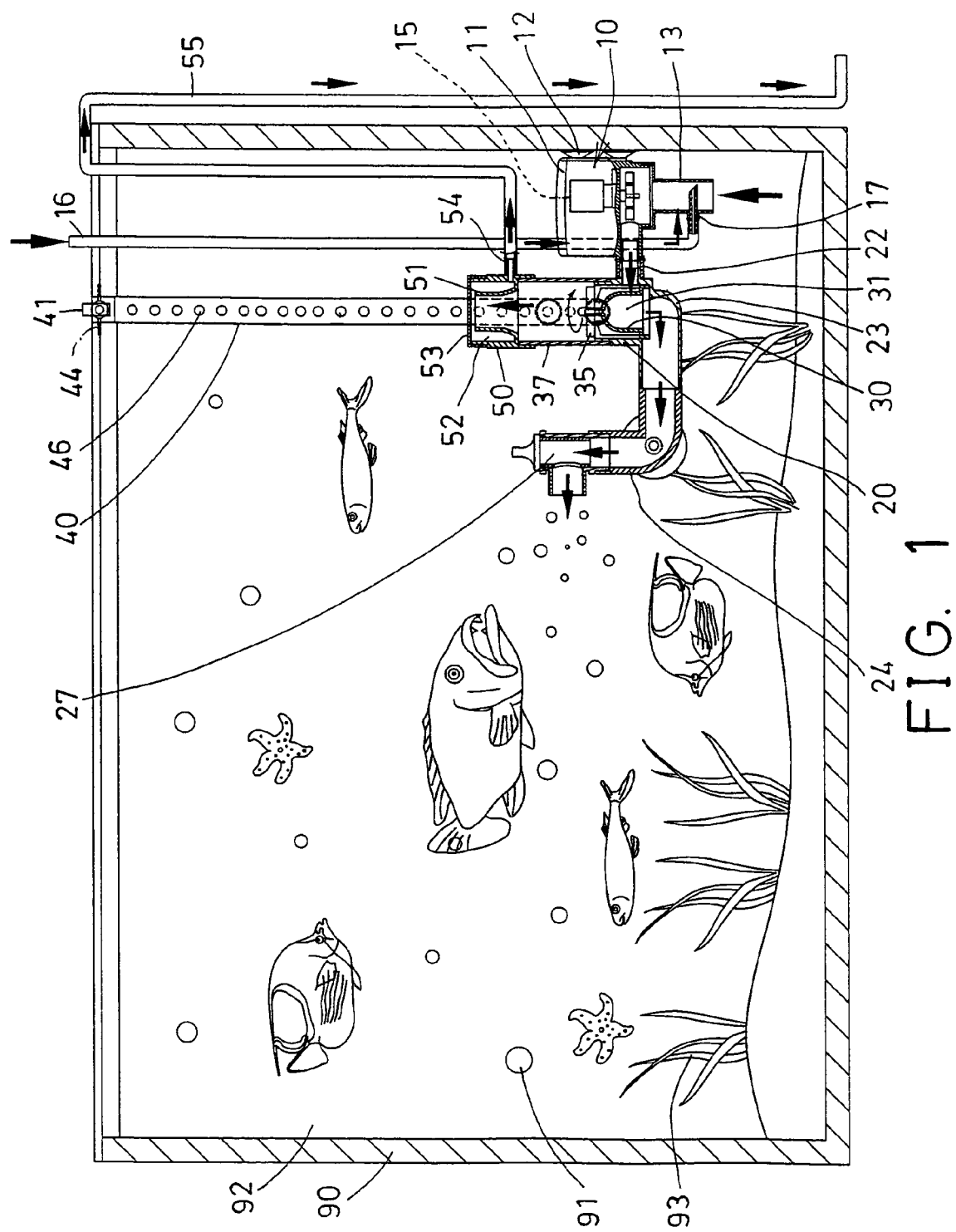
FIG. 1 is a partial cross sectional view illustrating an attachment of a water aerating and dirt collecting assembly in accordance with the present invention to an aquarium.

Referring to the drawings, and initially to FIGS. 1–4, a water aerating and dirt collecting assembly in accordance with the present invention is generally designated with a reference numeral 10, and is provided for attaching to an aquarium 90, for pumping air 91 into the water 92 contained within the aquarium 90, and/or for circulating the water 92 in the aquarium 90.

The water aerating and dirt collecting assembly 10 comprises a container 11 received in the aquarium 90 and attachable to the aquarium 90 with such as sucker members 12. The container 11 includes an entrance 13 and an exit 14 formed or provided thereon, for allowing the water 92 to flow into and to flow out of the container 11.

A pump 15 is received in the container 11, to pump the water 92 into and out of the container 11, and thus to circulate the water 92 in the aquarium 90. A hose 16 includes a port 17 engaged into the entrance 13 of the container 11, to selectively supply fresh air (FIGS. 1, 8, 11) or carbon dioxide from a carbon dioxide reservoir 18 (FIG. 10) into the aquarium 90, and thus to suitably supply the fresh air or the carbon dioxide 18 to the plants 93 contained within the aquarium 90.

A housing 20 may also be received in the container 11, and includes a chamber 21 formed therein to receive a guide device 30, and includes an inlet 22 coupled to the exit 14 of the container 11, to receive the water 92, and/or the fresh air and/or the carbon dioxide 18 from the container 11. The housing 20 includes an outlet 23 to supply the water 92, and/or the fresh air and/or the carbon dioxide 18 into the aquarium 90. The guide device 30 is disposed or arranged between the inlet 22 and the outlet 23 of the housing 20.

For example, one or more elbows or manifolds 24 and/or one or more couplers 25 may be coupled to the outlet 23 of the housing 20, and/or a diffuser member 26 (FIGS. 6–10) may be attached to either of the elbows or manifolds 24 and/or the couplers 25, to smoothly supply the water 92, and/or the fresh air and/or the carbon dioxide 18 into any suitable or predetermined positions in the aquarium 90.

Alternatively, as shown in FIGS. 1–4 and 11, a control valve 27 may be directly attached or coupled to the outlet 23 of the housing 20, or indirectly attached or coupled to the outlet 23 of the housing 20 via one or more elbows or manifolds 24 and/or one or more couplers 25, to control the flowing speed and/or the supplying quantity of the water 92, and/or the fresh air and/or the carbon dioxide 18 into the aquarium 90.

Figure 2:
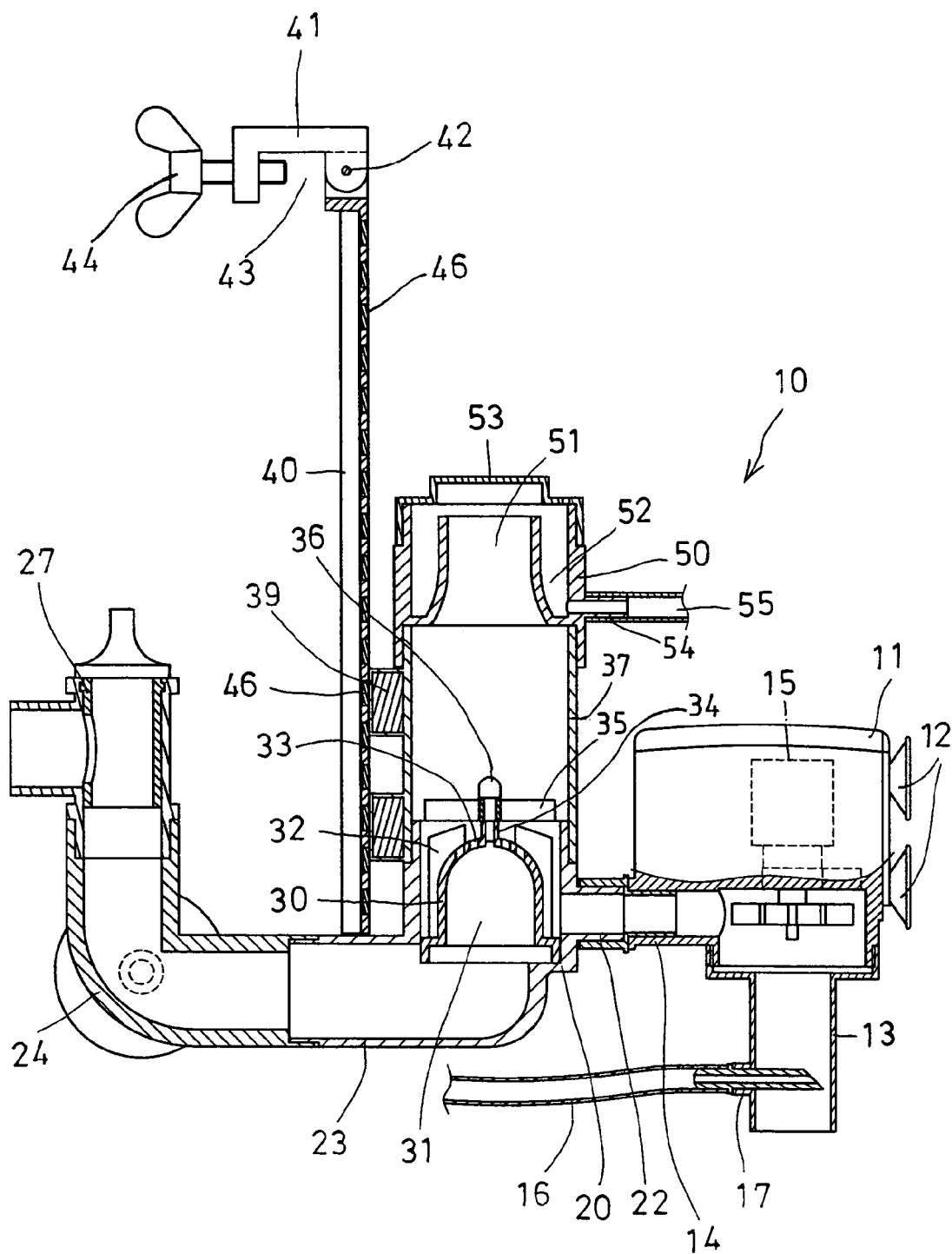
FIG. 2 is an enlarged partial cross sectional view of the water aerating and dirt collecting assembly for aquariums.
Figure 3:
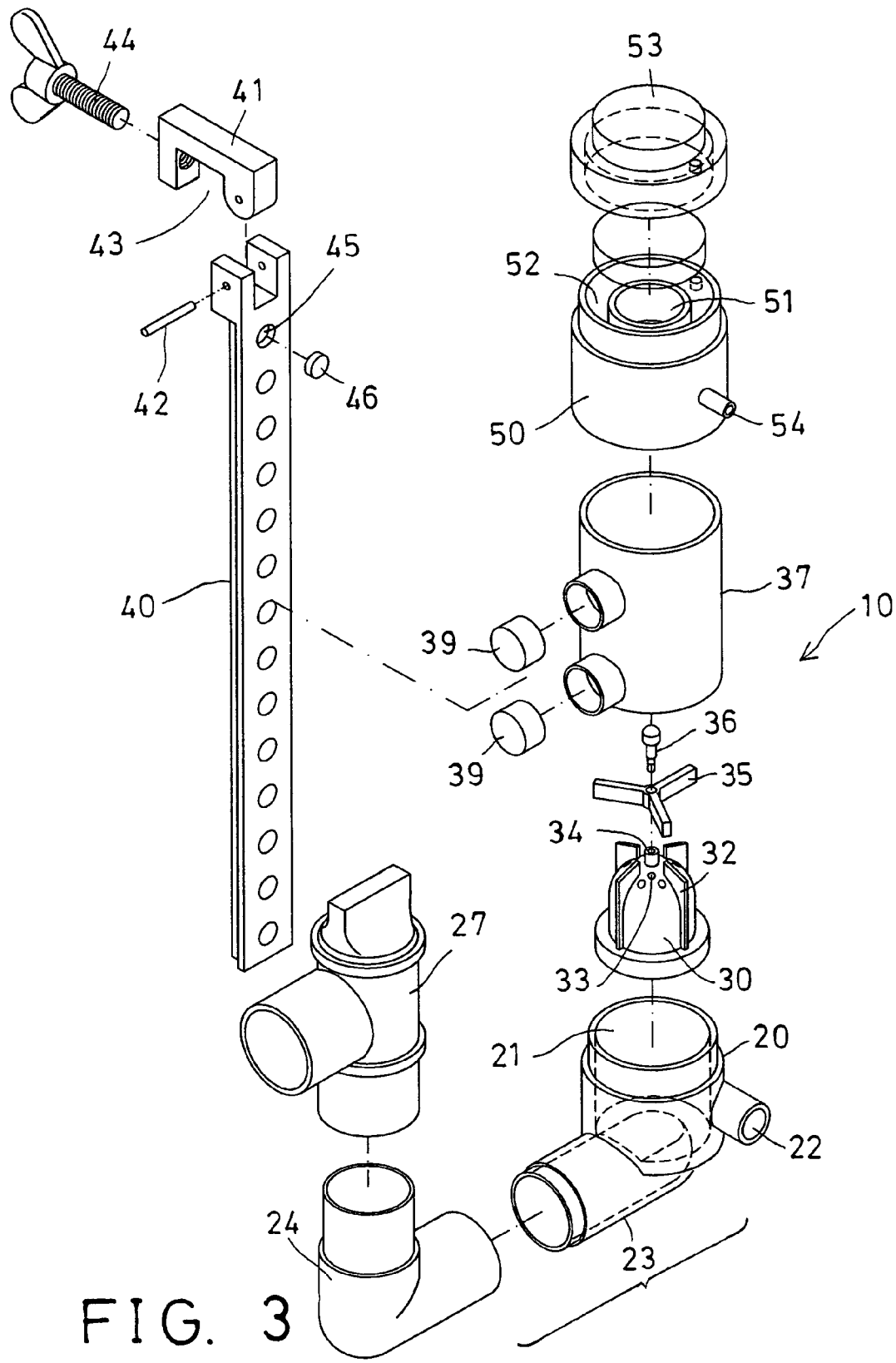
FIG. 3 is a partial exploded view of the water aerating and dirt collecting assembly for aquariums.
Figures 4, 5:
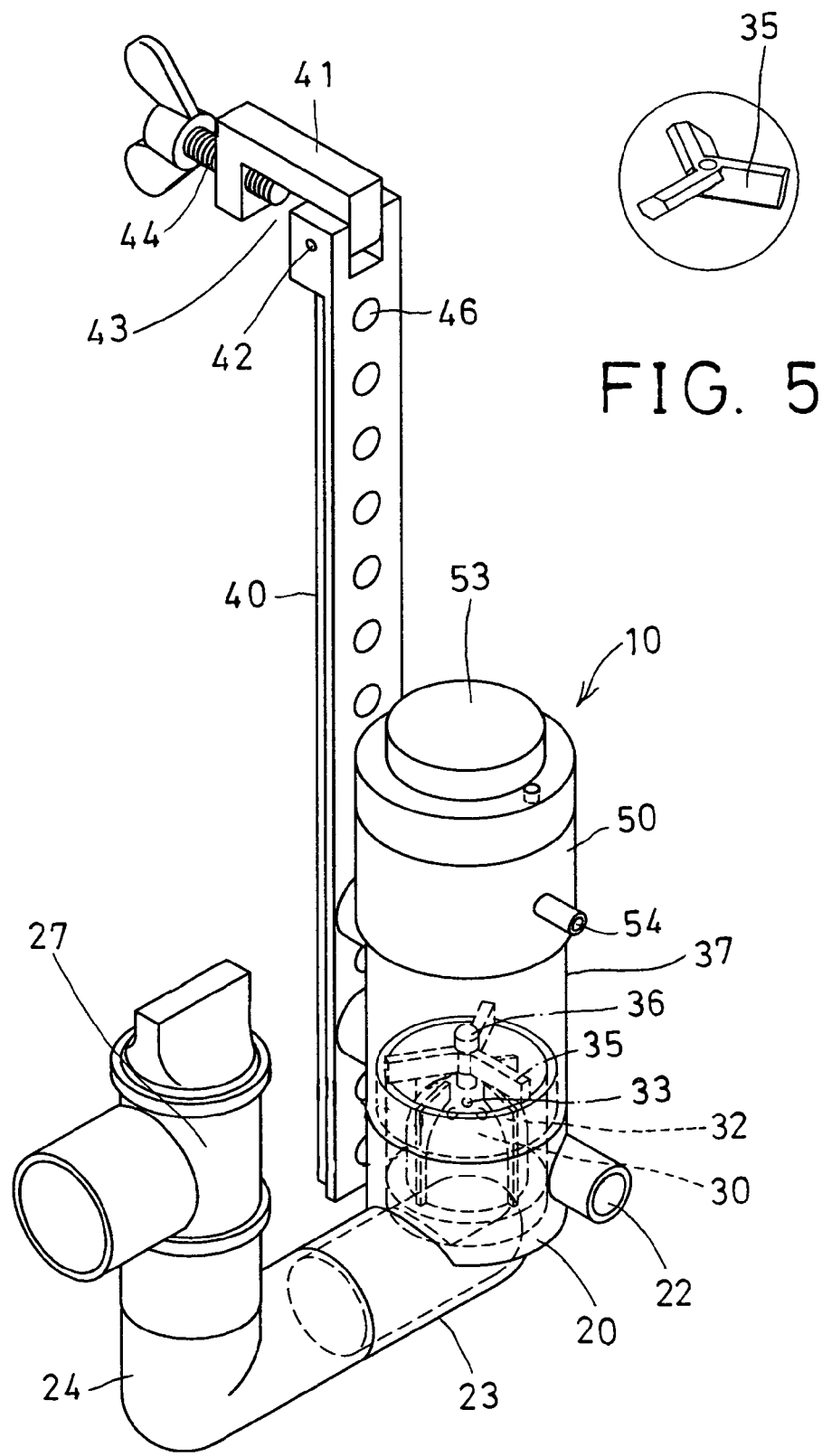
FIG. 4 is a partial perspective view of the water aerating and dirt collecting assembly for aquariums.
FIG. 5 is a perspective view illustrating a similar paddle wheel for the water aerating and dirt collecting assembly for aquariums.
Figure 6:
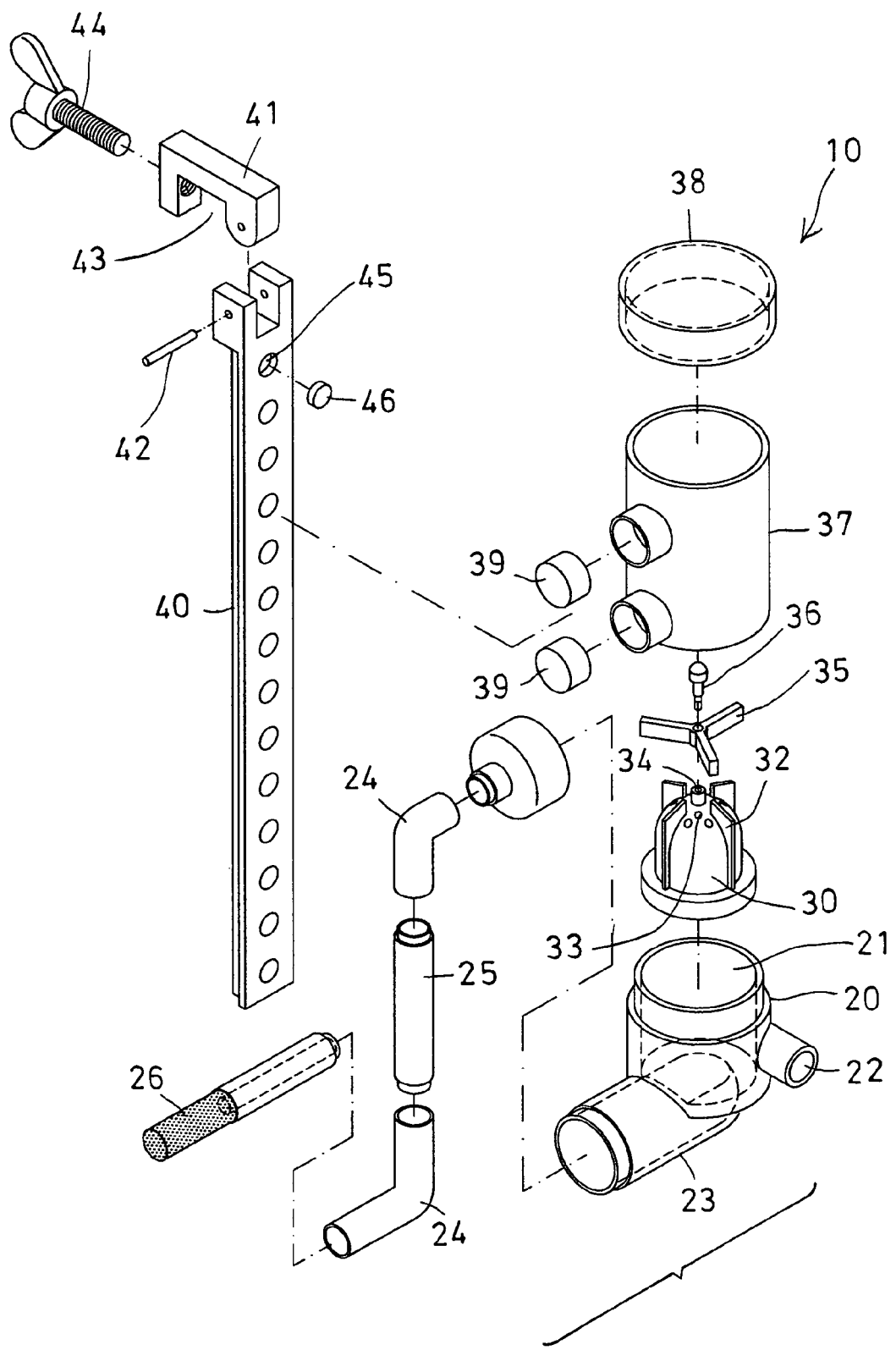
FIG. 6 is a partial exploded view similar to FIG. 3, illustrating the other arrangement of the water aerating and dirt collecting assembly for aquariums.
Figure 7:
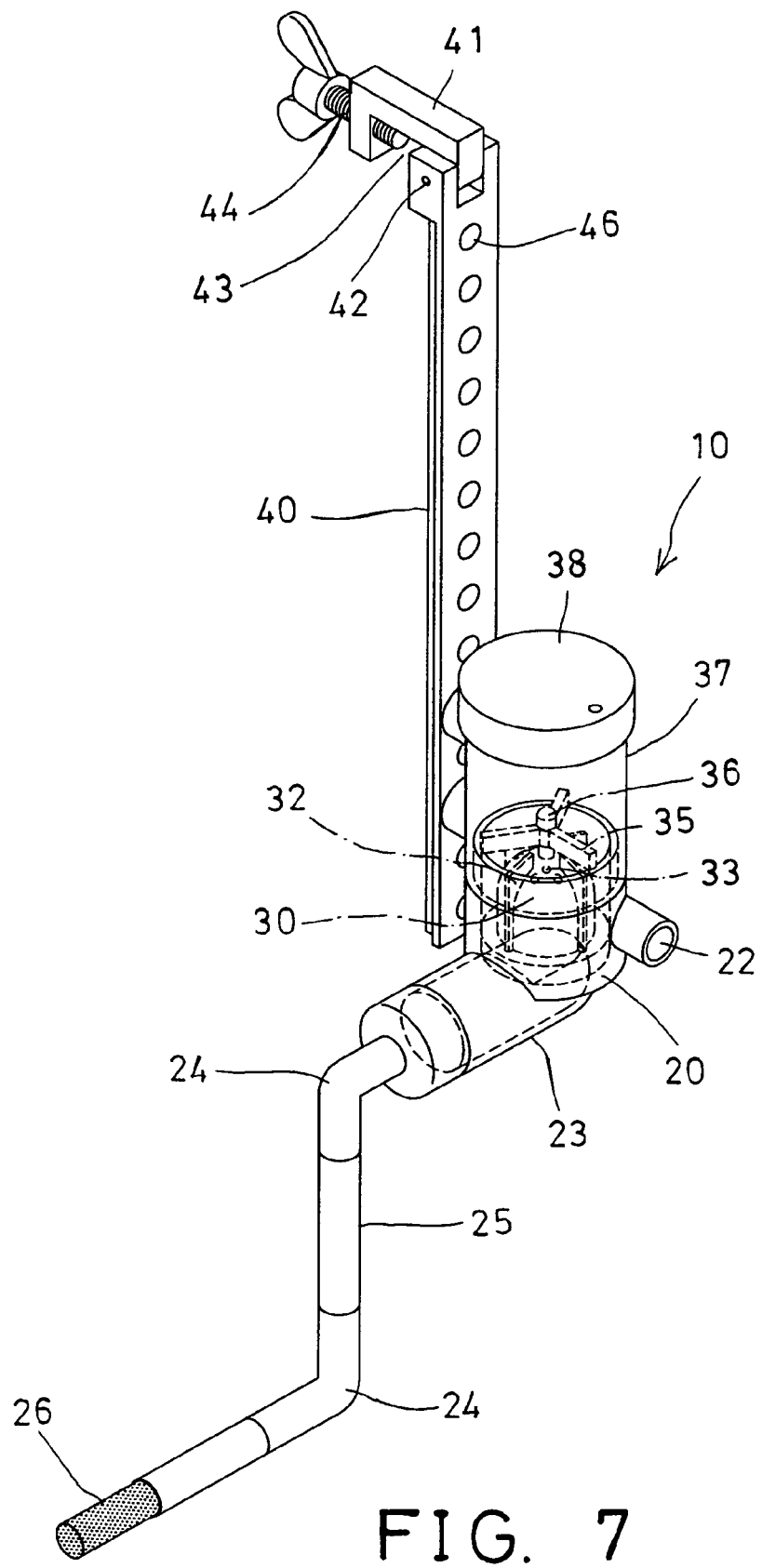
FIG. 7 is a partial perspective view similar to FIG. 4, illustrating the other arrangement of the water aerating and dirt collecting assembly as shown in FIG. 6.

The guide device 30 is disposed or secured in the chamber 21 of the housing 20 with such as adhesive materials, fasteners (not shown), or the like, and includes a space 31 formed therein and facing toward or communicating with the outlet 23 of the housing 20, best shown in FIGS. 1 and 2, and includes one or more fins 32 extended outwardly therefrom, and includes a number of orifices 33 formed in the upper portion thereof.

The guide device 30 further includes a hub 34 formed or provided on top thereof, and a paddle wheel 35 is rotatably attached to the guide device 30 with a shaft 36 which may be attached to the hub 34 of the guide device 30. The paddle wheel 35 may include various kinds of shapes or configurations, such as those shown in FIGS. 2–4 and 5.

The water pumped into the chamber 21 via the inlet 22 of the housing 20 may be forced onto the outer peripheral portion and/or the fins 32 of the guide device 30, in order to generate an eddy current. The eddy current may then flow into the space 31 via the orifices 33 of the guide device 30, to allow the fresh air and/or the carbon dioxide 18 to be evenly distributed within the water 92, and to allow the eddy current to smoothed down.

In addition, the eddy current may force or drive the paddle wheel 35 to rotate, to further generate an eddy current, and to further the fresh air and/or the carbon dioxide 18 to be evenly distributed within the water 92. A barrel 37 may further be provided and attached or secured onto the housing 20, to receive the eddy currents, and a cover 38 may be attached onto the barrel 37 (FIGS. 6–10), to confine the eddy currents, and thus to guide or to force the eddy currents to flow into the space 31 via the orifices 33 of the guide device 30.

It is to be noted that the forcing of the water 92 flowing onto the fins 32 of the guide device 30, and the agitating of the water 92 by the paddle wheel 35 may force the fresh air and/or the carbon dioxide 18 to be evenly distributed within the water 92, and thus to allow the fresh air and/or the carbon dioxide 18 to be evenly or suitably supplied to the fishes and/or the plants 93 contained within the aquarium 90.

Figure 11:
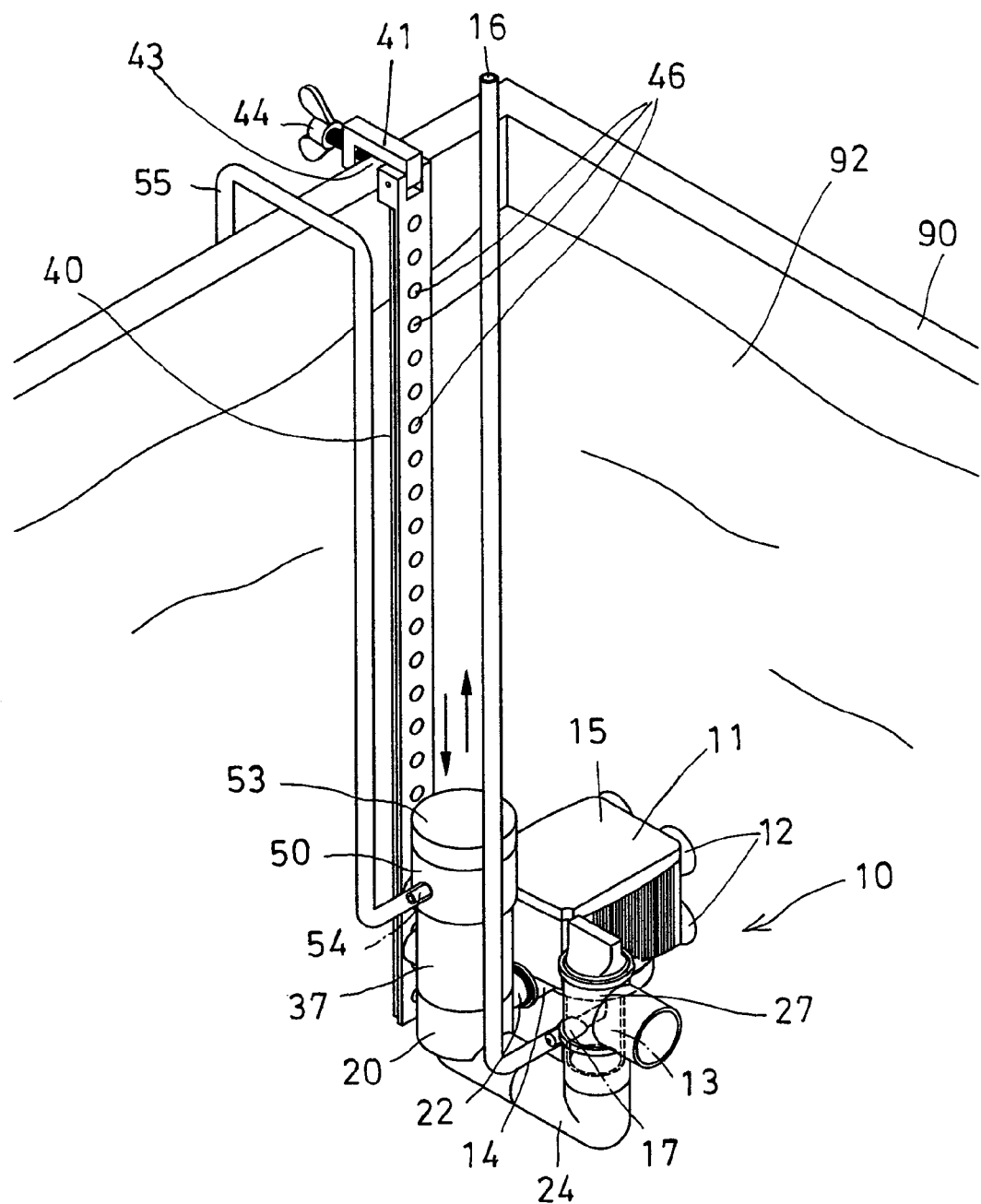
FIG. 11 is a partial perspective view illustrating the height adjustment of the water aerating and dirt collecting assembly relative to the aquariums.

A rack 40 may be attached to the aquarium 90 with a bracket 41. For example, the rack 40 includes an upper end pivotally or rotatably attached to the bracket 41 with a pivot pin 42, and the bracket 41 includes a recess 43 formed therein to receive the peripheral wall of the aquarium 90 (FIG. 11). One or more fasteners 44 may further be provided to solidly secure the bracket 41 to the aquarium 90. The rack 40 includes a number of cavities 45 formed therein to receive magnets 46 therein respectively.

One or more magnets 39 may be attached to the barrel 37, and may be acted with or attracted with the magnets 46 of the rack 40, to detachably attach or secure the barrel 37 and thus the housing 20 to the rack 40, and to allow the barrel 37 and thus the housing 20 to be easily and quickly moved or adjusted relative to the rack 40 to any suitable or selected heights, best shown in FIGS. 1, 8, 10, 11.

Referring again to FIGS. 1–4, a casing 50 may further be provided and selectively attached or secured onto the barrel 37 after the cover 38 (FIGS. 6–10) has been removed from the barrel 37. The casing 50 includes a tubular member 51 extended therein to form or define an annular chamber 52 therein, and may include a cap 53 openably attached on top thereof to selectively enclose the casing 50. The tubular member 51 includes a height smaller or lower than that of the casing 50, best shown in FIGS. 1 and 2, to allow the water 92 or air bubbles to flow into the annular chamber 52 of the casing 50.

In operation, the eddy currents generated by the forcing or the impacting of the water 92 onto the fins 32 of the guide device 30, and by the agitating of the water 92 by the paddle wheel 35 may generate air bubbles, and the air bubbles may carry and move the dirt and/or the protein or the like contained in the water 92 upwardly through the tubular member 51 of the casing 50, and thus to allow the dirt and/or the protein or the like to be received or collected within the annular chamber 52 of the casing 50.

The casing 50 includes a discharge port 54 formed or provided in the lower portion thereof and communicating with the lower portion of the annular chamber 52 of the casing 50, to allow the collected dirt and/or protein or the like to be removed from the annular chamber 52 of the casing 50. A hose 55 may be coupled to the discharge port 54 of the casing 50, to facilitate the outwardly discharging of the collected dirt and/or protein or the like from the annular chamber 52 of the casing 50.

Figure 8:
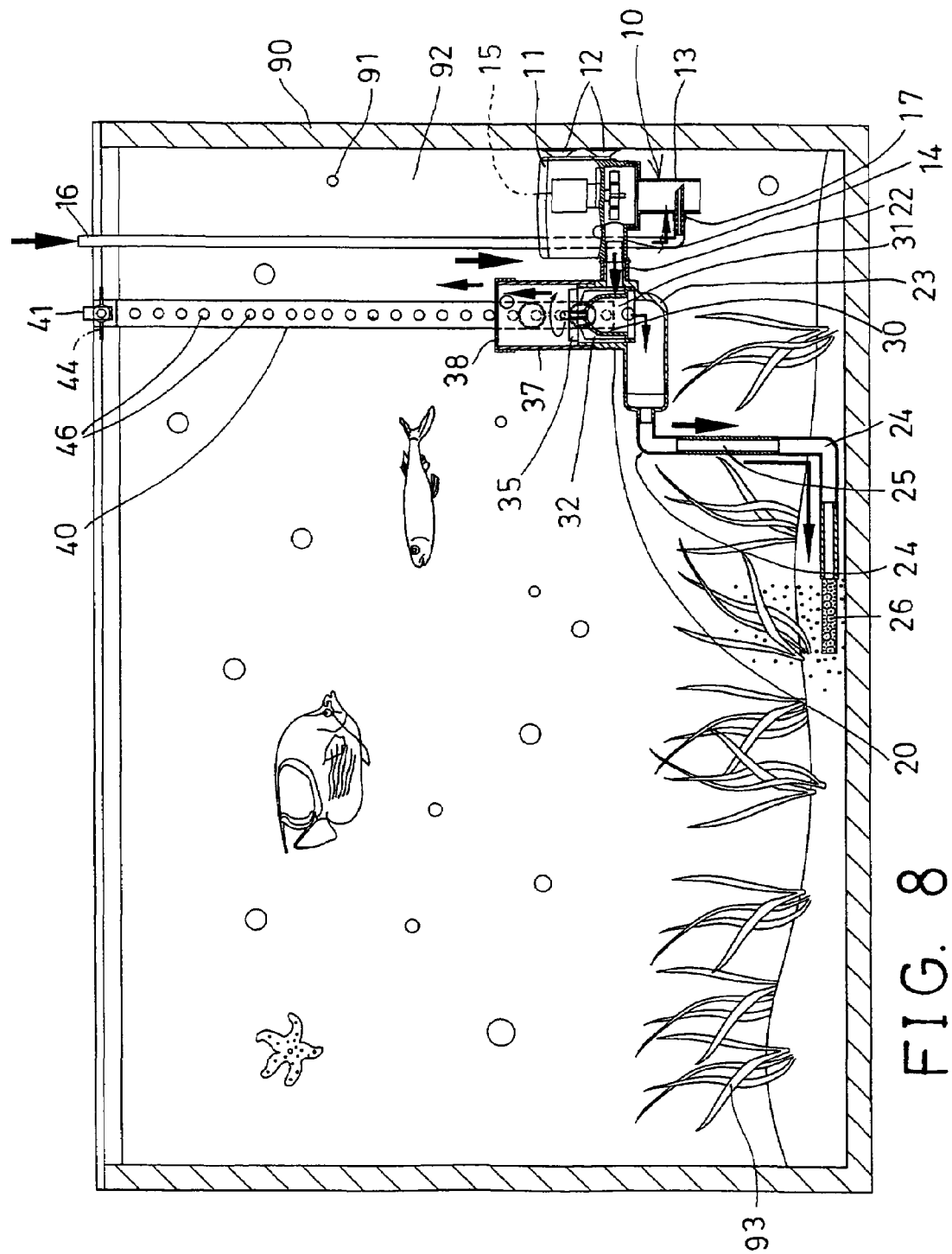
FIG. 8 is a partial cross sectional view similar to FIG. 1, illustrating the attachment of the water aerating and dirt collecting assembly as shown in FIGS. 6 and 7 to the aquarium.
Figure 9:
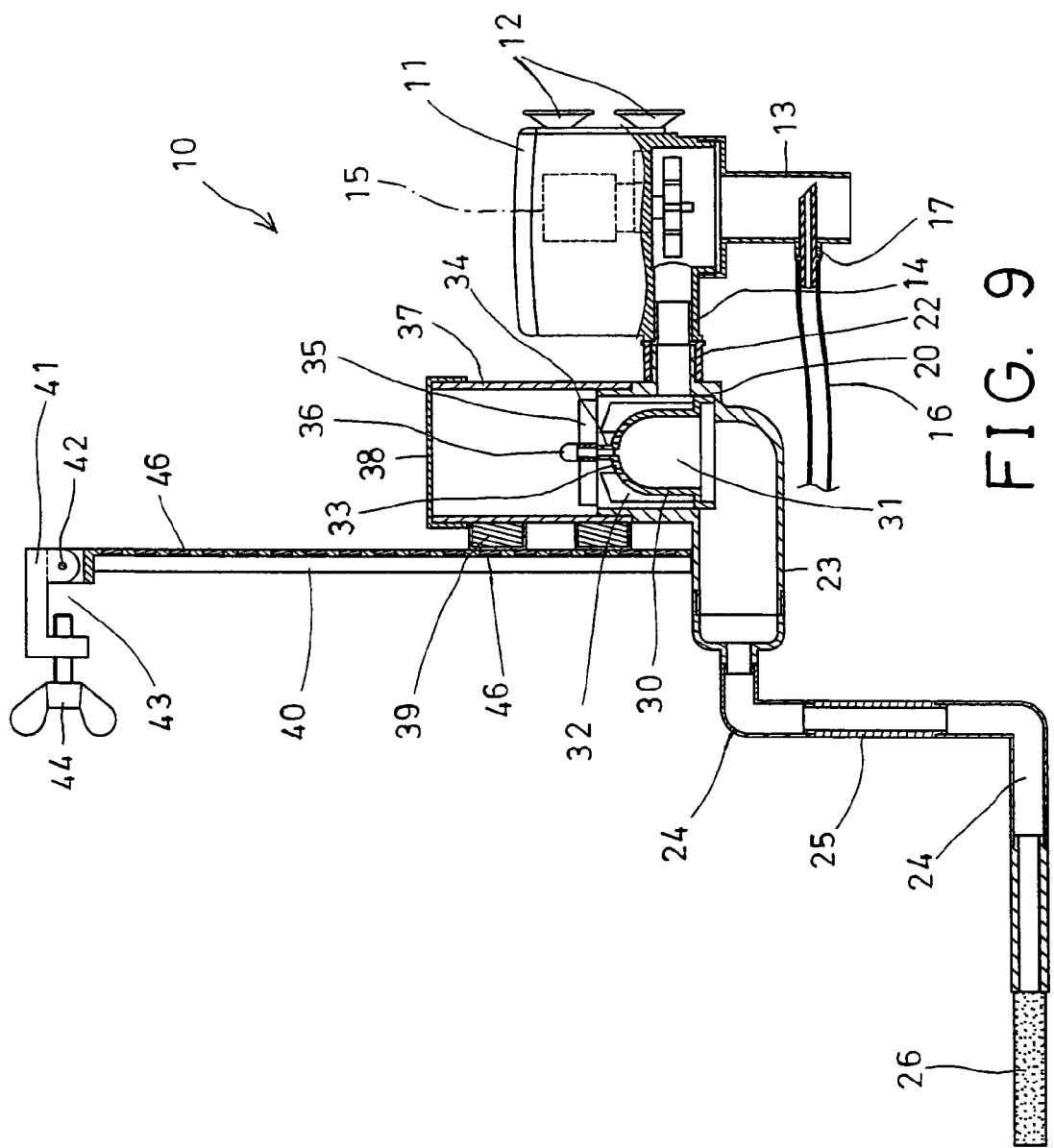
FIG. 9 is an enlarged partial cross sectional view illustrating the water aerating and dirt collecting assembly as shown in FIGS. 6–8.

In operation, as shown in FIG. 8, fresh air may be supplied into the entrance 13 of the container 11 via the hose 16, and may be pumped into the housing 20 together with the water 92, by the pump 15, to generate eddy currents by the guide device 30 and/or by the paddle wheel 35, and thus to allow the fresh air to be evenly distributed within the water 92, and to be suitably supplied to the fishes contained in the aquarium 90.

Figure 10:
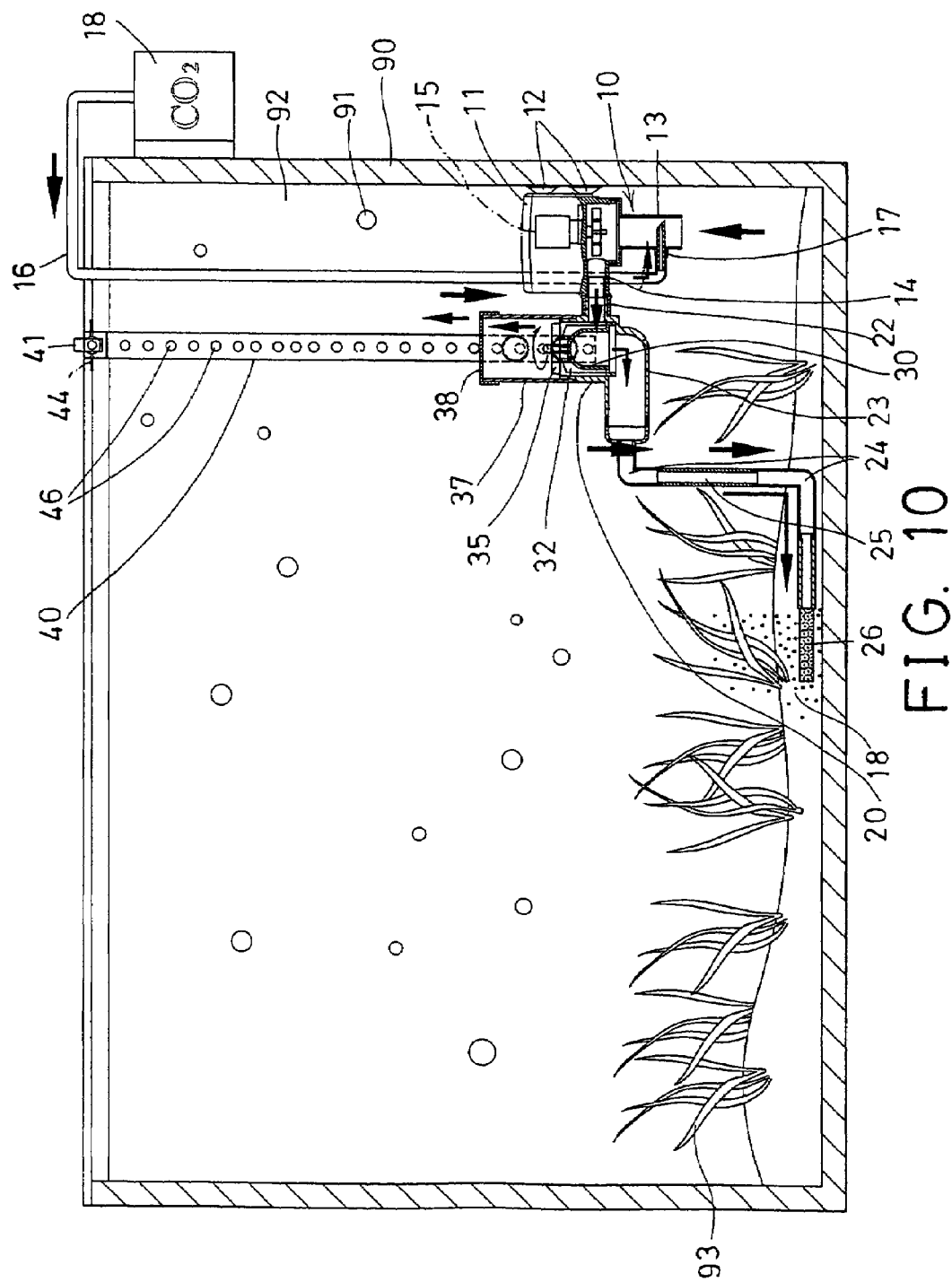
FIG. 10 is a partial cross sectional view similar to FIGS. 1 and 8, illustrating the other application of the water aerating and dirt collecting assembly.

As shown in FIG. 10, alternatively or selectively, the carbon dioxide 18 may be supplied into the entrance 13 of the container 11 via the hose 16, and may be pumped into the housing 20 together with the water 92, by the pump 15, to generate eddy currents by the guide device 30 and/or by the paddle wheel 35, and thus to allow the carbon dioxide 18 to be evenly distributed within the water 92, and to be suitably supplied to the plants 93 contained in the aquarium 90.

As shown in FIG. 1, when the water 92 contained in the aquarium 90 is contaminated or is required to be cleaned, for example, the casing 50 may be selectively attached or secured onto the barrel 37, to confine the air bubbles generated by the forcing or the impacting of the water 92 onto the fins 32 of the guide device 30, and by the agitating of the water 92 by the paddle wheel 35, and to receive and collect the dirt and/or the protein or the like within the annular chamber 52 of the casing 50, and then to allow the collected dirt and/or protein or the like to be removed from the annular chamber 52 of the casing 50.

None of the typical water aerating devices and/or water filtering devices include a guide device 30 having one or more fins 32 extended outwardly therefrom, to generate eddy currents and/or air bubbles.

Accordingly, the water aerating and dirt collecting assembly in accordance with the present invention includes may be attached to aquariums to selectively pump air and/or carbon dioxide into the aquariums, and/or to generate bubbles to collect dirt or protein or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A water aerating assembly for an aquarium, said water aerating assembly comprising:
   a housing including a chamber formed therein, and including an inlet and an outlet arranged to allow water to flow into and out of said chamber of said housing,
   a guide device received in said chamber of said housing and arranged between said inlet and said outlet of said housing,
   means for aerating the water,
   a paddle wheel rotatably attached onto said guide device, and
   means for pumping the water into said chamber of said housing to force the water to actuate said paddle wheel and to generate eddy current.

2. The water aerating assembly as claimed in claim 1, wherein said guide device includes at least one fin extended therefrom to generate eddy current when the water is forced onto said at least one fin of said guide device.

3. The water aerating assembly as claimed in claim 1, wherein said guide device includes a space formed therein and includes a plurality of orifices formed therein and communicating with said space of said guide said device to guide the eddy current to flow through said orifices and into said space of said guide device.

4. The water aerating assembly as claimed in claim 1, wherein said guide device includes a hub provided therein, and said paddle wheel is rotatably attached to said hub with a shaft.

5. The water aerating assembly as claimed in claim 1, wherein said pumping means includes a container having an exit coupled to said inlet of said housing, and having an entrance to allow the water to flow into said container, and includes a pump received in said container.

6. The water aerating assembly as claimed in claim 5 further comprising a hose coupled to said entrance of said container to supply air into said container via said entrance of said container.

7. The water aerating assembly as claimed in claim 6 further comprising a carbon dioxide reservoir coupled to said hose to selectively supply carbon dioxide into said container.

8. The water aerating assembly as claimed in claim 1 further comprising a barrel attached onto said housing to receive the eddy current.

9. The water aerating assembly as claimed in claim 8 further comprising a cover selectively attached onto said barrel to selectively enclose said barrel.

10. The water aerating assembly as claimed in claim 8 further comprising a casing attached onto said barrel to receive air bubbles generated by the eddy current.

11. The water aerating assembly as claimed in claim 10, wherein said casing includes a tubular member extended therein to form an annular chamber therein, and to collect dirt carried with the air bubbles.

12. The water aerating assembly as claimed in claim 11, wherein said tubular member includes a height smaller than that of said casing.

13. The water aerating assembly as claimed in claim 11, wherein said casing includes a cap attached thereto to enclose said casing.

14. The water aerating assembly as claimed in claim 11, wherein said casing includes a discharge port formed therein and communicating with said annular chamber thereof to discharge the collected dirt.

15. The water aerating assembly as claimed in claim 8 further comprising a rack for attaching to the aquarium, and means for adjusting said barrel relative to said rack.

16. The water aerating assembly as claimed in claim 15, wherein said adjusting means includes at least one magnet attached to said barrel, and at least one magnet attached to said rack to act with said at least one magnet attached to said barrel.

17. The water aerating assembly as claimed in claim 15, wherein said rack includes a bracket pivotally secured thereto for attaching to the aquarium.

18. The water aerating assembly as claimed in claim 1 further comprising a valve coupled to said outlet of said housing.

* * * * *